US007008656B2

(12) United States Patent
Zimmerman, Jr. et al.

(10) Patent No.: US 7,008,656 B2
(45) Date of Patent: Mar. 7, 2006

(54) SELF-HEATING MEAL PACKAGE AND TRAY

(75) Inventors: Donald T. Zimmerman, Jr., Cincinnati, OH (US); William S. Smith, Jr., Cincinnati, OH (US); Andrew B. McLandrich, Cincinnati, OH (US)

(73) Assignee: The HeaterMeals Company, Cincinnati, OH (US)

( * ) Notice: Subject to any disclaimer, the term of this patent is extended or adjusted under 35 U.S.C. 154(b) by 700 days.

(21) Appl. No.: 09/791,298

(22) Filed: Feb. 23, 2001

(65) Prior Publication Data

US 2002/0119229 A1   Aug. 29, 2002

(51) Int. Cl.
*B65D 1/34* (2006.01)

(52) U.S. Cl. ............ 426/114; 426/122; 426/810; 206/736; 206/217; 206/541; 206/485.1; 206/563

(58) Field of Classification Search ........ 426/112–115, 426/122, 810; 206/736, 752, 216–217, 541, 206/547, 485.1, 562–563; 126/263.01–263.09
See application file for complete search history.

(56) References Cited

U.S. PATENT DOCUMENTS

| 2,512,963 | A | * | 6/1950 | Peiker | 229/28 |
|---|---|---|---|---|---|
| 2,808,191 | A | * | 10/1957 | Cramer | 229/30 |
| 2,924,372 | A | * | 2/1960 | Kirkeby | 229/34 |
| 3,149,770 | A | * | 9/1964 | Spillson | 229/30 |
| 3,608,770 | A | * | 9/1971 | Naimoli | 220/16 |
| 3,683,889 | A | | 8/1972 | Hoffman | |
| 3,774,589 | A | | 11/1973 | Kober | |
| 3,871,357 | A | | 3/1975 | Grosso et al. | |
| 4,138,014 | A | | 2/1979 | Bouman | |
| 4,338,098 | A | | 7/1982 | Yamaji | |
| 4,510,919 | A | | 4/1985 | Benmussa | |
| 4,522,190 | A | | 6/1985 | Kuhn et al. | |
| 4,559,921 | A | | 12/1985 | Benmussa | |
| 4,572,423 | A | * | 2/1986 | Spencer | 229/28 R |
| 4,705,173 | A | * | 11/1987 | Forbes, Jr. | 206/563 |
| 4,757,937 | A | * | 7/1988 | Maio et al. | 229/41 B |
| 4,762,113 | A | | 8/1988 | Hamasaki | |
| 4,771,761 | A | | 9/1988 | Doukhan et al. | |
| 4,809,673 | A | | 3/1989 | Charvin | |
| 4,867,131 | A | | 9/1989 | van der Merwe et al. | |
| 4,966,296 | A | | 10/1990 | Farrell | |
| 5,035,230 | A | | 7/1991 | Steidl et al. | |
| 5,117,809 | A | | 6/1992 | Scaringe et al. | |

(Continued)

FOREIGN PATENT DOCUMENTS

JP   2000023628 A   *   1/2000

*Primary Examiner*—Drew Becker
(74) *Attorney, Agent, or Firm*—Steven J. Rosen (57) ABSTRACT

A carton for storing and serving a self-heating meal and a beverage container includes a closable first compartment for storing and heating the meal. The first compartment has a first top wall and a first flap covering a first opening to the first compartment and a first securing means for releasably securing the first flap in a first closed position. The carton includes a second compartment for storing the beverage container and has a hole in a second top wall of the second compartment for holding the beverage container. An exemplary embodiment of the invention includes a second flap attached to the second top wall covers a second opening to the second compartment. A third compartment in the carton is disposed between the first and second compartments wherein the third compartment is open along a top side of the carton.

30 Claims, 6 Drawing Sheets

U.S. PATENT DOCUMENTS

| | | |
|---|---|---|
| 5,220,909 A | 6/1993 | Pickard et al. |
| 5,295,475 A | 3/1994 | Kaneko |
| 5,365,038 A | 11/1994 | Mitsugu |
| 5,390,659 A | 2/1995 | Scaringe et al. |
| 5,477,847 A | 12/1995 | Ueki |
| 5,517,981 A | 5/1996 | Taub et al. |
| 5,611,329 A | 3/1997 | Lamensdorf |
| 5,788,081 A * | 8/1998 | Bates ................... 206/562 |
| 5,922,376 A | 7/1999 | Privert |
| 5,927,502 A | 7/1999 | Hunter |
| 5,935,486 A | 8/1999 | Bell et al. |
| 6,173,833 B1 * | 1/2001 | Strehlow ............. 206/216 |
| 6,401,927 B1 * | 6/2002 | Sorensen et al. ...... 206/562 |

* cited by examiner

SELF-HEATING MEAL PACKAGE AND TRAY

BACKGROUND OF THE INVENTION

1. Field of the Invention

The present invention relates generally to individual self-heating meal modules and packages and, more particularly, to an individual self-heating meal and package that also is useful as a serving tray.

2. Discussion of the Background Art

Self-heating meal modules of the type used, for example, by the military to heat rations of food for an individual are well known. One example of a self-heating meal module is described in U.S. Pat. No. 4,559,921 which discloses a self-heating receptacle having a vessel for food to be heated. U.S. Pat. No. 5,220,909 entitled "Self-heating individual meal module" discloses a self-heating individual meal module which includes a tub for holding a quantity of food to be heated. Below the tub is a tray containing an electrolytic-solution-activated exothermic-chemical pad and a pouch containing an electrolytic solution. The tub is welded to the tray and in contact with the pad. A pull-tab is attached to the pouch for opening the pouch so that the electrolytic solution inside the pouch can flow out to trigger the exothermic reaction in the pad so as to heat the tub containing the food. The tub and the tray are removably seated in a first paperboard carton which provides protection during storage and transportation and insulation during the heating process. The self-heating individual meal module may also include a second paperboard carton having removably seated inside a quantity of bread, a beverage powder, a dessert, accessories and eating utensils. The two paperboard cartons may be glued together to provide a complete single serve meal.

U.S. Pat. No. 4,522,190 discloses a flexible heater material (heat pad) for food heating, medical compresses and the like. The heat pad is a composite material consisting of a super-corroding metallic alloy powder dispersed throughout a porous polyethylene matrix. The super-corroding alloy material consists of a powered alloy of magnesium and iron which is produced by high energy power metallurgical milling techniques. Pressureless sintering of a mixture of the super-corroding alloy powders with UHMW polyethylene powder results in the formation of a flexible porous matrix material with active ingredients therein that are readily activated with a suitable electrolyte fluid.

What is needed and not found in the prior art is a package that also can be used as a serving tray for the self-heating individual meal. It is desirable that the package be compact, inexpensive, easily stowed, and hold the entire meal including the self-heating meal and additional packaged foods such as snacks and a beverage. It is desirable that the package be able to hold or support the beverage in an upright position suitable for drinking. It is also desirable that the package be useful for insulating the self-heating individual meal while it is being heated and provide a stable support when it is used as a tray for the meal while it is being eaten.

SUMMARY OF THE INVENTION

A carton for storing a self-heating meal assembly and a beverage container includes a closable first compartment having a first top wall and a first flap covering a first opening to the first compartment and a first securing means for releasably securing the first flap in a first closed position. The carton includes a second compartment for storing the beverage container and has a hole in a second top wall of the second compartment for holding the beverage container.

In a first exemplary embodiment of the invention, the first flap is a first side of the carton and attached to a bottom of the carton and the first securing means is a bendable first end tab along a first free end of the first flap. In another embodiment, the second compartment further includes a second flap covering a second opening to the second compartment and a second securing means for releasably securing the second flap in a second closed position. The second flap is a second side of the carton and is attached to the second top wall and the second securing means is a bendable second end tab along a second free end of the second flap. The exemplary embodiments of the carton include scored lines in the first top wall, the scored lines outlining an aperture area and being suitable to form an aperture by cutting along the scored lines. The scored lines define bendable aperture flaps suitable to be bent inward to form the aperture after cutting along the scored lines.

Exemplary embodiments of the carton further include a third compartment in the carton disposed between the first and second compartments wherein the third compartment is open along a top side of the carton.

In an alternative embodiment of the carton, the first flap includes a first top wall of the first compartment bendably connected to a first side of the carton. An inner side wall of the first compartment is bendably connected to the first top wall and the securing means is an end tab along a free end of the first flap wherein the end tab is suitable for being slid and held inside a slot in a bottom side of the carton.

The invention includes a self-heating meal assembly including the carton and the self-heating meal stored in the first compartment and a beverage container stored in the second compartment. In the exemplary embodiment, a heating container stored within the first compartment contains the self-heating meal. A packet containing an exothermic dry mixture is also included in the carton wherein the dry mixture is operable to be activated with activating liquid to generate heat through electrochemical reactions. The packet is a wetable packet which allows activating liquid to pass through to contact the dry mixture and cause the dry mixture to be activated and generate heat through electrochemical reactions. The scored lines in the first top wall outline an aperture area suitable to form an aperture sized to hold the heating container. The third compartment contains packaged foods such as packaged snacks, chips, cookies, and desserts.

The invention provides a carton for storing and cooking a self-heating meal as well as serving as a tray for holding the self-heating meal. A first compartment is suitable for cooking the meal as well as storing it and a second compartment is useful for both storing and holding a beverage container. The carton is easily assembled from a one-piece blank and is easily stored. It can be made of cardboard and is thus easily disposed of and is biodegradable so that it does not harm the environment.

BRIEF DESCRIPTION OF THE DRAWINGS

The novel features believed characteristic of the present invention are set forth and differentiated in the claims. The invention is more particularly described in conjunction with the accompanying drawings in which:

DETAILED DESCRIPTION

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Figure 1:
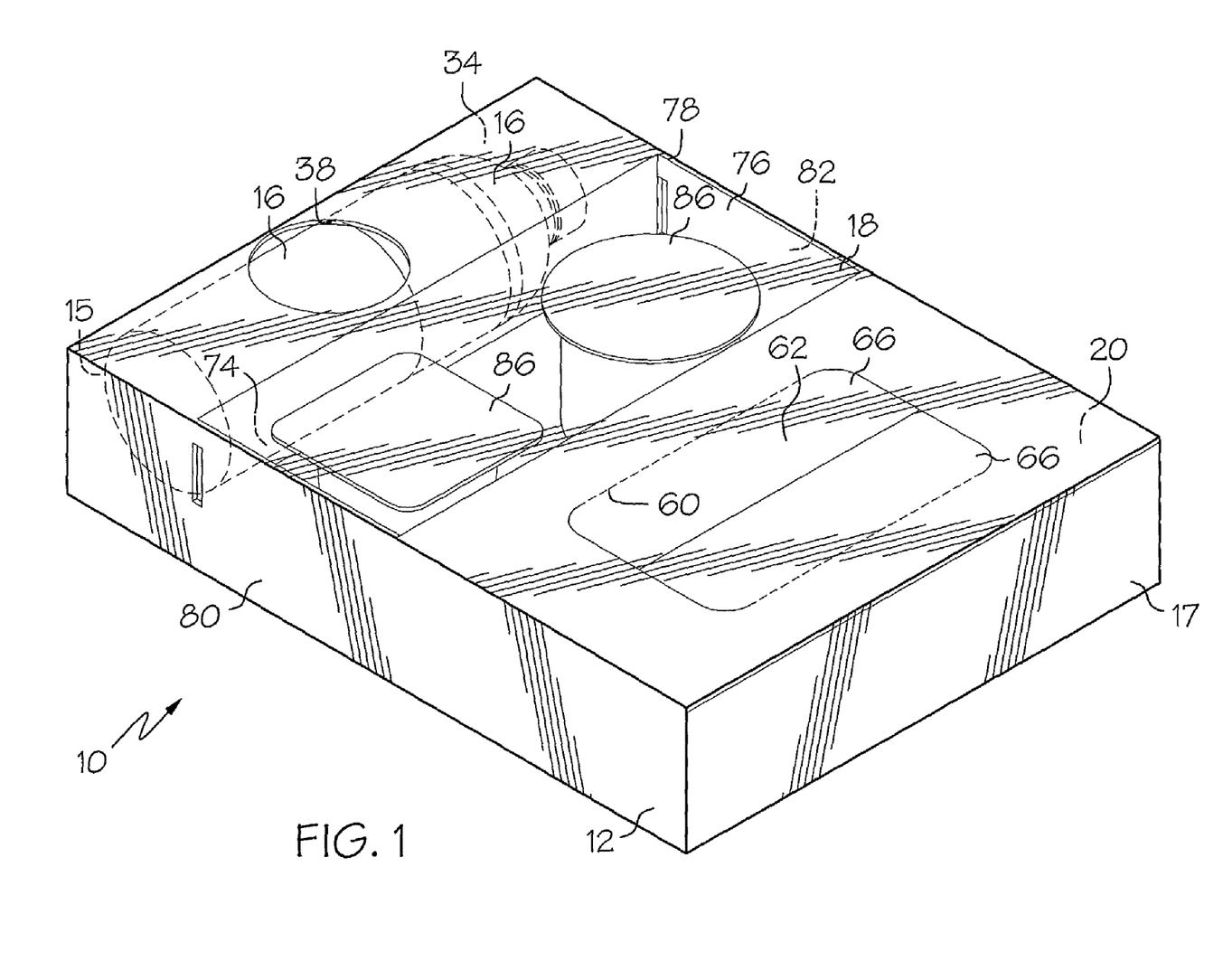
FIG. 1 is a top looking down perspective view illustration of an exemplary embodiment of an individual self-heating meal package.
Figure 2:
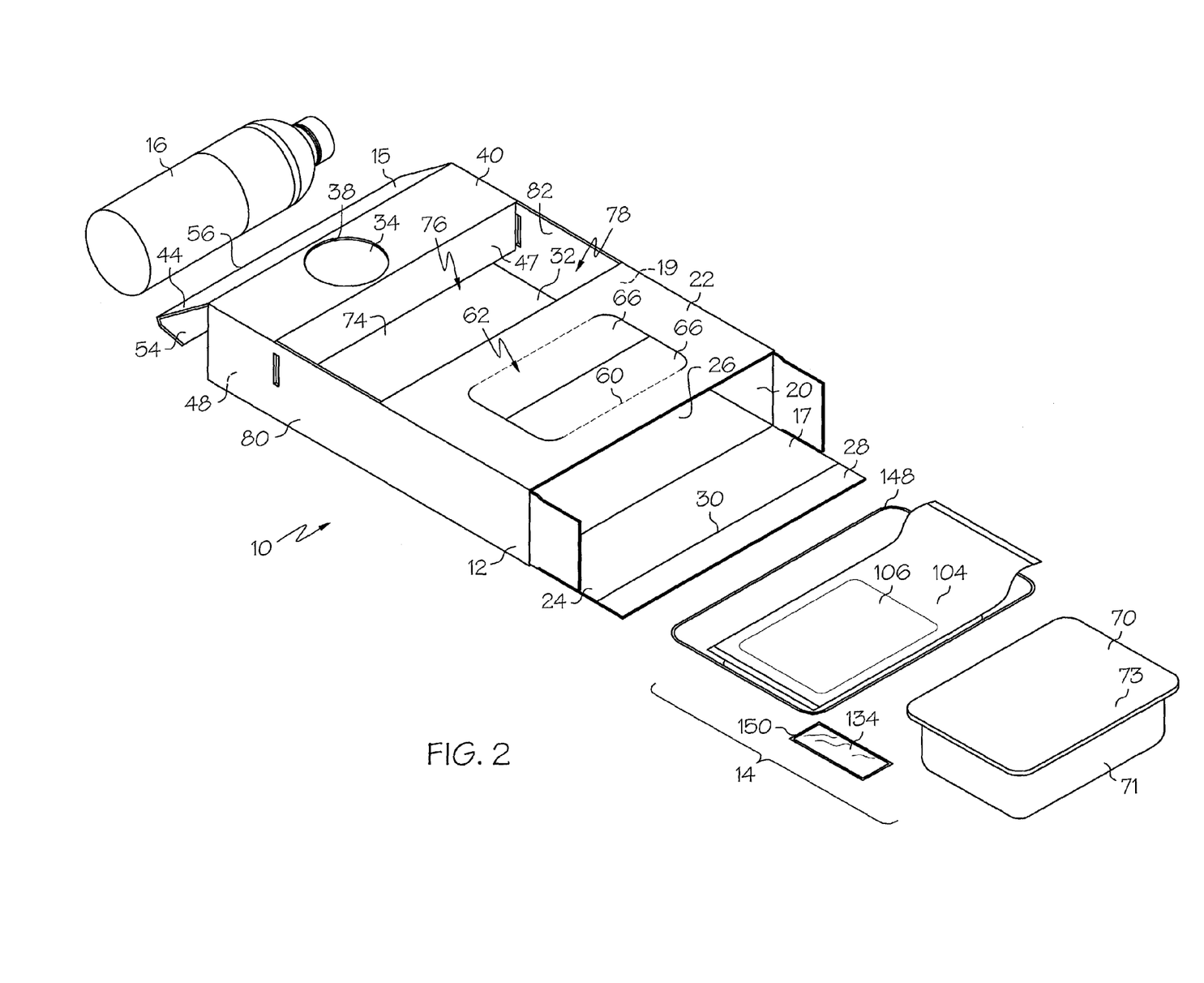
FIG. 2 is an exploded perspective view illustration of a self-heating meal assembly as stored in the package illustrated in FIG. 1.

Illustrated in FIGS. 1 and 2 is an exemplary embodiment of a self-heating meal package 10 having carton 12 within which is stored a self-heating meal assembly 14 (illustrated in FIG. 2) and a beverage container 16. The exemplary embodiment of the carton 12 has a rectangular shape with spaced apart bottom and top sides 32 and 78. The carton 12 has spaced apart front and back sides 80 and 82, respectively, that are normal to the bottom side 32 and spaced apart left and right sides 15 and 17 (left and right designation is arbitrary and relative) which are normal to the front and back sides 80 and 82 and to the bottom and top sides 32 and 78. All the spaced apart opposite sides of the carton are generally parallel to each other and adjacent sides are generally normal to each other. The exemplary embodiment of the carton 12 made of cardboard and is wrapped and sealed with a clear material 18 such as plastic.

The carton 12 includes a closable first compartment 20 having a first top wall 22 and a first flap 24 covering a first opening 26 to the first compartment. The first flap 24 structurally serves as the right side 17 of the carton 12 and is spaced apart from a parallel first inner wall 19. The first compartment 20 is bounded by the first flap 24, the first inner wall 19, the bottom side 32, and the first top wall 22.

The first flap 24 is bendably attached to a bottom side 32 of the carton 12. A first securing means for releasably securing the first flap 24 in a first closed position is provided and illustrated as a first tab 28 bendably attached to a free end 30 of the first flap 24. The first compartment 20 is closed by bending down the first flap 24 and tucking the first tab 28 into the first compartment with the first tab bent in spring tension against the bottom side 32 of the carton 12. The first compartment 20 is designed to store the self-heating meal assembly 14 which includes a heating container 70 within which is stored a meal to be heated such as an entree of a meal. The first compartment 20 is also designed to hold and insulate the heating container 70 when it is being heated and the first securing means allows this process to be done safely.

The carton 12 includes a second compartment 34 for storing the beverage container 16 and has a hole 38 in a second top wall 40 of the second compartment for holding the beverage container. The second compartment 34 further includes second flap 44 covering a second opening 48 to the second compartment and a second securing means for releasably securing the second flap in a second closed position. The second flap 44 structurally serves as the right side 17 of the carton 12 and is spaced apart from a parallel second inner wall 47. The second flap 44 is bendably attached to the second top wall 40. Attaching the second flap 44 to the second top wall 40 provides additional strength to the carton 12 which is particularly useful because it is located near the hole 38 in the second top wall. The second securing means is illustrated as a bendable second end tab 54 along a second free end 56 of the second flap. The second compartment 34 is bounded by the second flap 44, the second top wall 40, the second inner wall 47, and the bottom side 32.

Figure 3:
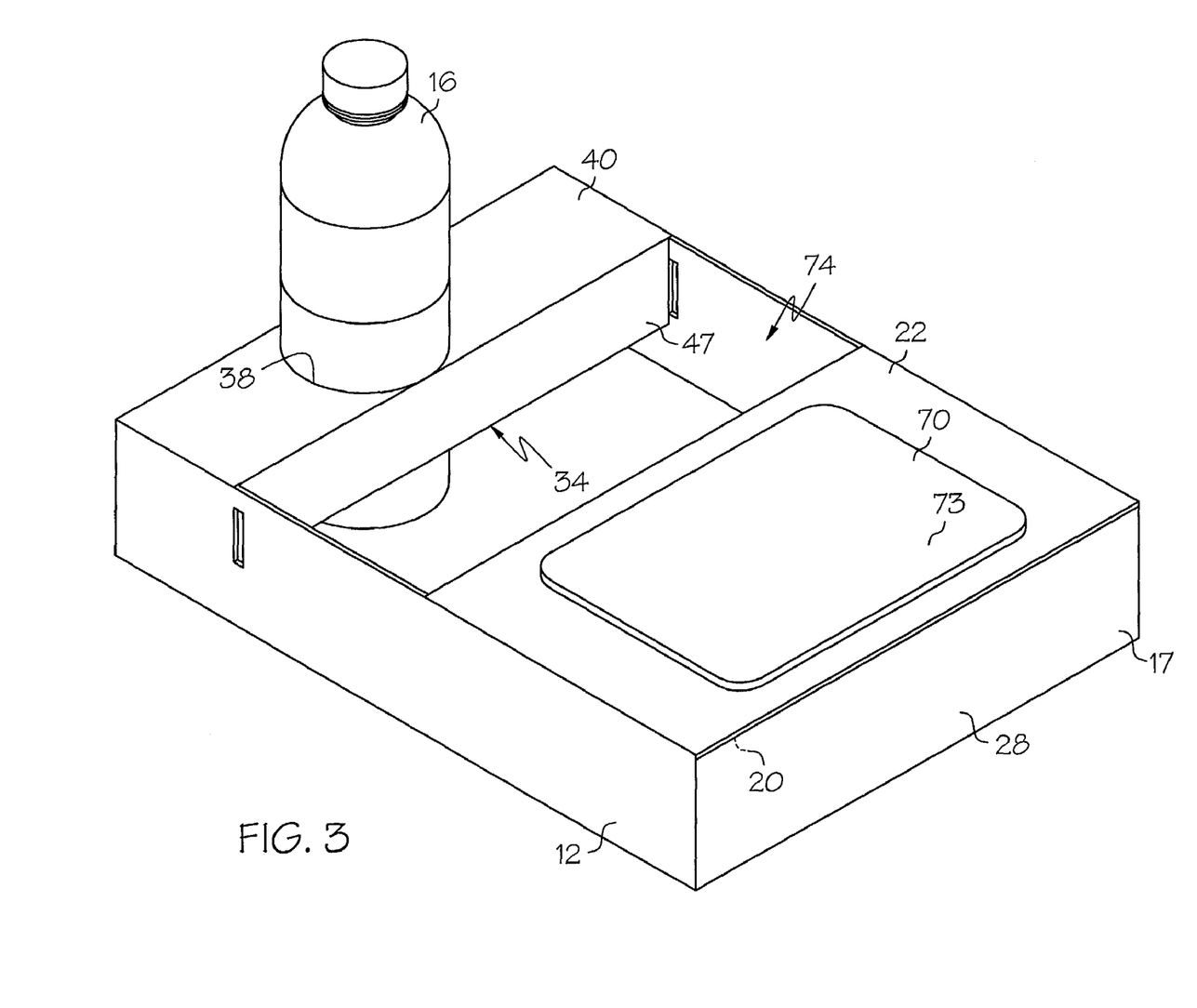
FIG. 3 is a perspective view illustration of a self-heating meal heating container and a beverage container held in place in a carton of the package illustrated in FIG. 1.
Figure 6:
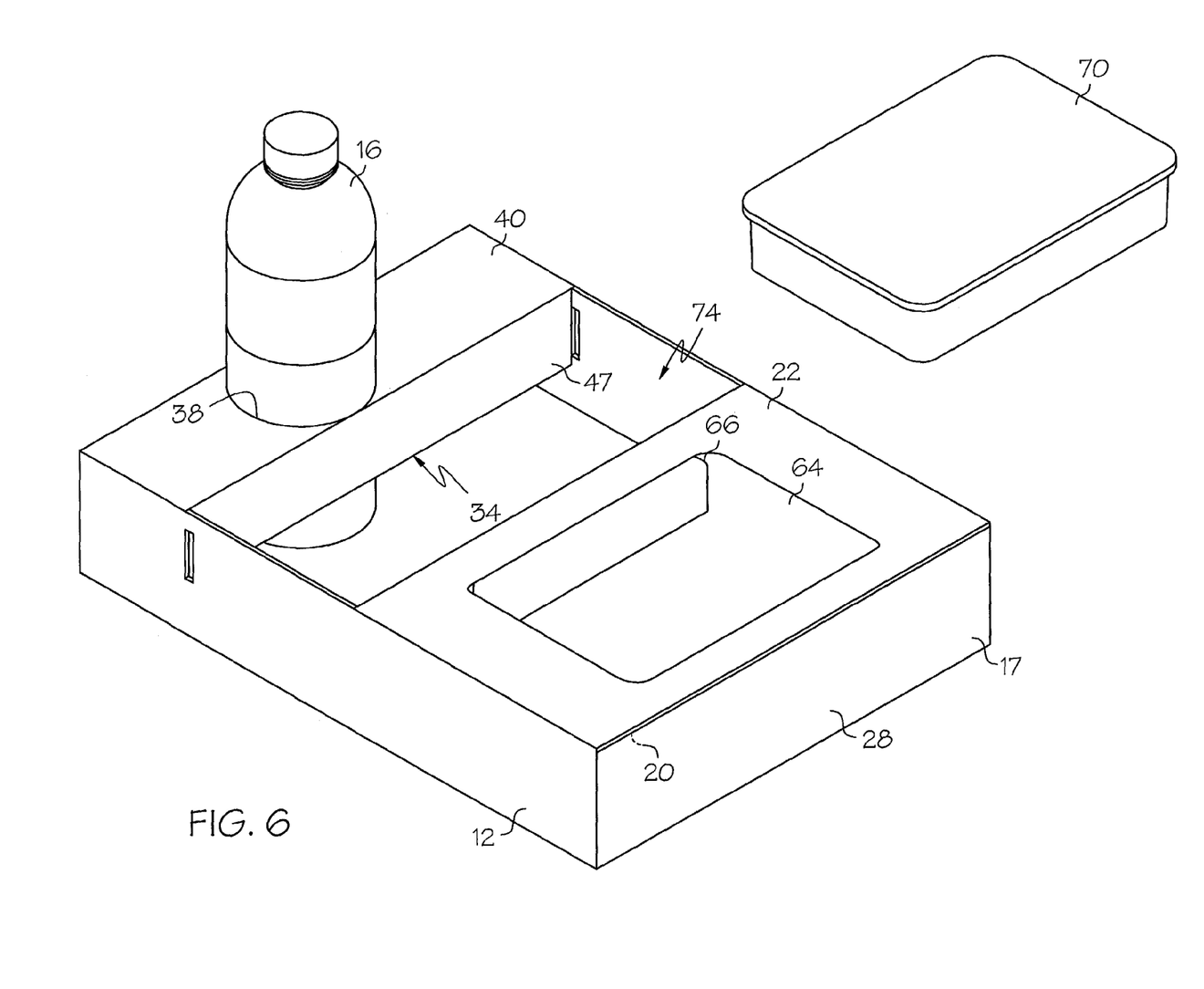
FIG. 6 is a perspective view illustration of the self-heating meal heating container removed from the carton of the package illustrated in FIG. 3.

Scored lines 60 in the first top wall 22 outline an aperture area 62 that is being suitable to form an aperture 64, illustrated in FIG. 6, by cutting or breaking the first top wall along the scored lines. The scored lines 60 define bendable aperture flaps 66, also illustrated in FIG. 6, that can be bent inwardly to form the aperture after cutting along the scored lines. The aperture 64 is designed to securely hold the heating container 70 after it has been heated, as illustrated in FIG. 3. The invention is designed to provide a carton 12 which serves to store the meal, safely hold the meal during heating, and safely support and hold the hot meal while it is being consumed.

The exemplary embodiment of the carton 12 further includes a third compartment 74 having an open top 76 and disposed between the first and second compartments 20 and 34, respectively. The third compartment 74 is open along a top side 78 of the carton 12. In the exemplary embodiment, the top side 78 is co-planar with the first and second top walls 22 and 40. The exemplary embodiment of the carton has a rectangular shape such that all the opposite sides of the carton are generally parallel to each other and adjacent sides are generally normal to each other. The carton 12 has front and back sides 80 and 82, respectively, that are normal to the bottom side 32 and the first and second flaps 24 and 44 serve as first and second or left and right hand sides (the order being arbitrary) of the carton 12. The top side 78 of the carton structurally includes the first and second top walls 22 and 40. The third compartment 74 may be incorporated to store and hold other packaged food items such as chips, cookies, puddings, and other similar snacks 86.

Figure 4:
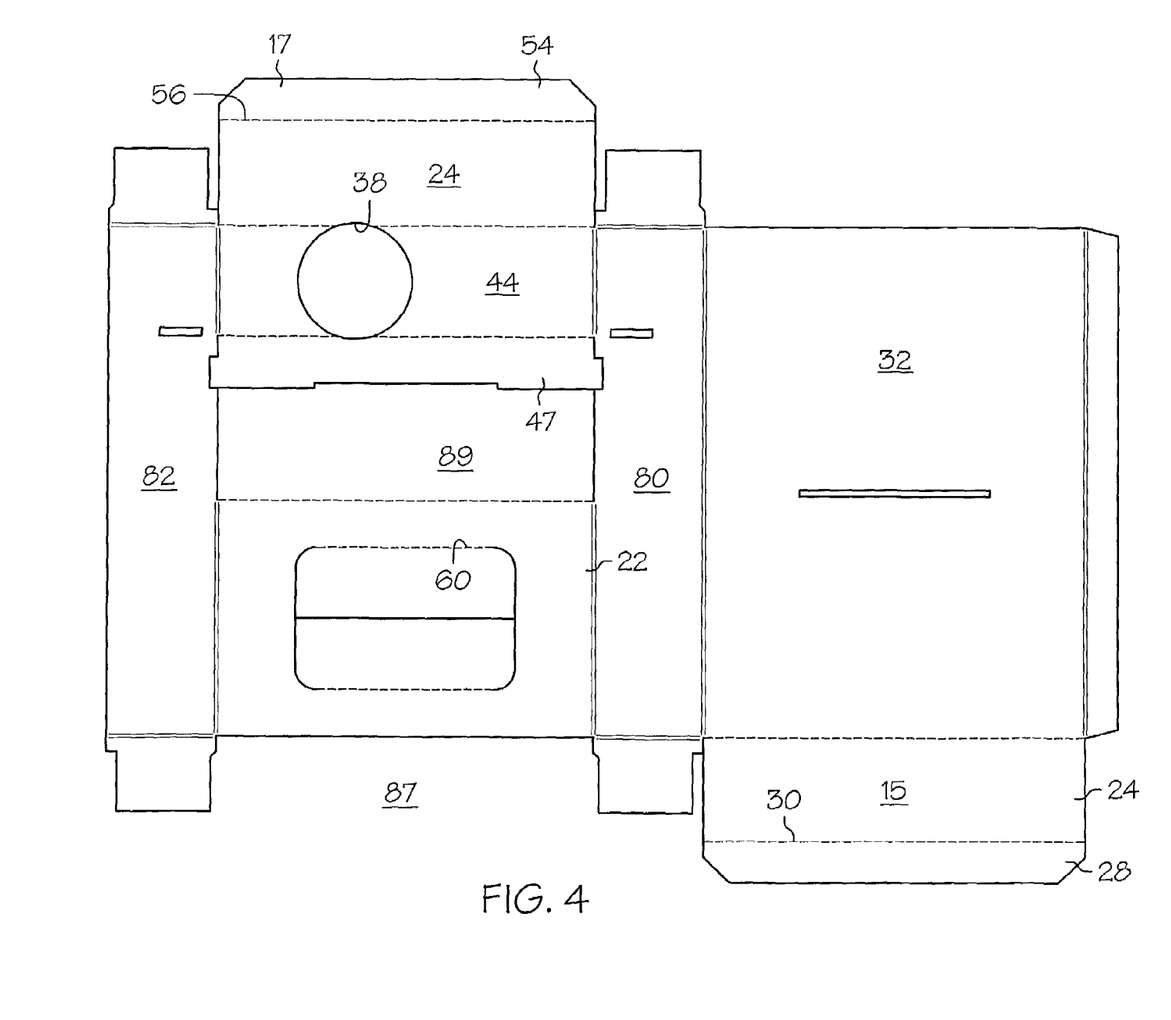
FIG. 4 is a top view illustration of an exemplary blank used to construct the carton in FIG. 3.

Illustrated in FIG. 4 is a top view illustration of an exemplary blank 87 used to construct the carton 12 in FIGS. 1–3. The portions of the blank 87 used to form the parts of the carton described above are identified herein by the corresponding part descriptions and identifying numerals. The blank 87 has portions corresponding to the bottom side 32, the front and back sides 80 and 82, and the spaced apart left and right sides 15 and 17. The first flap 24 is attached to the bottom side 32 of the blank 87 and the first tab 28 is attached to the free end 30 of the first flap 24. The hole 38 for the beverage container 16 is in the second top wall 40 and the second flap 44 which serves as the right side 17 of the carton 12 and is spaced apart from the second inner wall 47. The second flap 44 is attached to the second top wall 40. The bendable second end tab 54 along the second free end 56 is also formed in the blank 87. The scored lines 60 are in the first top wall 22. A central portion 89 is designed to be cut out to form the open top 76 to the third compartment 74 along the top side 78 of the carton 12.

Figure 5:
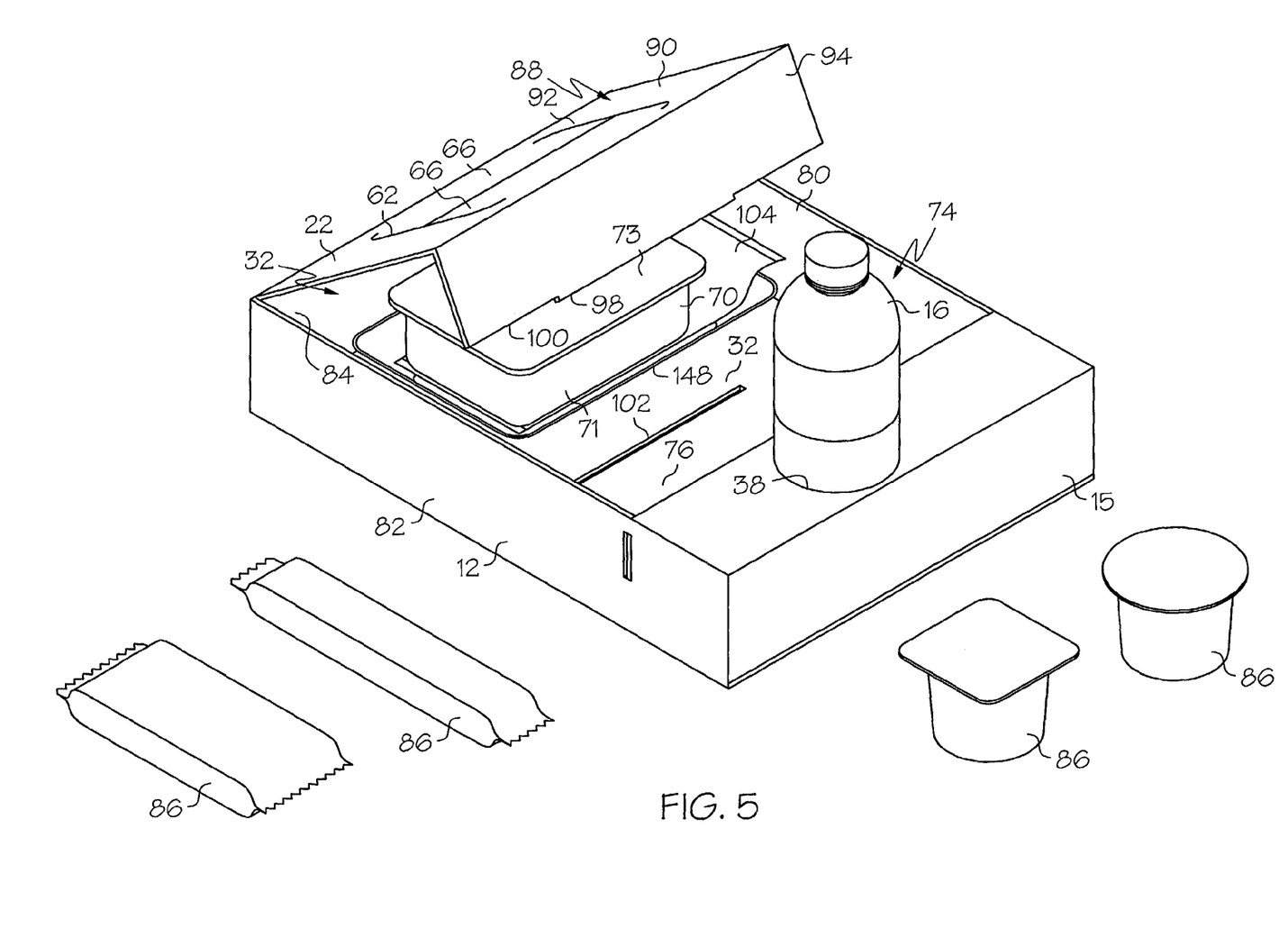
FIG. 5 is a perspective view illustration of an alternative individual self-heating meal carton.

Illustrated in FIG. 5 is an alternative embodiment of the carton 12 (turned around 180 degrees from the views in FIGS. 1–3) which has a fixed left hand side 84 of the carton and a lid 88. The closable first compartment 20 is covered and enclosable by the lid 88 which is in the form of a lid flap 90. The lid flap 90 has a top portion 92 bendably connected to the fixed left hand side 84 of the carton 12 and an inner side portion 94 bendably connected to the top portion 92. Structurally, the inner side portion 94 serves as the first inner wall 19 of the first compartment 20. A third securing means for releasably securing the lid flap 90 in a third closed position is provided and illustrated as a fixed end tab 98 along a free end 100 of the inner side portion 94. The fixed end tab 98 is suitable for being slid and held inside a slot 102 in the bottom side 32 of the carton 12.

The self-heating meal assembly 14 further includes a packet 104 containing an exothermic dry mixture 106 is operable to be activated with an activating liquid 134 to generate heat through electrochemical reactions. The packet 104 is a wetable packet which allows the activating liquid 134 to pass through to contact the dry mixture 106 and cause the dry mixture to be activated and generate heat through electrochemical reactions. The self-heating meal assembly 14 further includes a tray 148 for holding the packet 104 and the activating liquid 134 in a liquid container such as a sealed plastic bag 150 as illustrated in FIG. 2. The tray 148 holds the packet 104 and the activating liquid 134 stored in the sealed plastic bag 150. The food to be heated is stored in the heating container 70 and is placed on the tray 148 on top of the packet 104 and the activating liquid 134 after it has been released from the sealed plastic bag 150 by tearing or puncturing the sealed plastic bag in the tray 148. Then the activating liquid 134 seeps through the packet 104 and wets the dry mixture 106 which generates heat through electrochemical exothermic reactions. Then the tray 148 with the packet 104 and the wetted dry mixture 106 and the heating container 70 on top of the tray are placed in the first compartment 20 where it is insulated and the meal is heated. The heating container 70 is illustrated as having a tub 71 and covered with a plastic sealing lid 73. The heating container 70 is illustrated right side up with the plastic sealing lid facing upwards. The heating container 70 may be shipped upside down with the plastic sealing lid facing downwards and it may be heated in this position for faster and more complete heating.

The activator liquid may be just water if a salt is placed in the mixture. Alternatively, the activator liquid may be an electrolyte such as salt water. As can be seen from the prior art references, many types of dry mixtures and other types of flameless heaters are well known in the art. One particular embodiment of the dry mixture includes about 53% Magnesium by weight, about 3% Iron by weight, about 2% Low density Polyethylene (LPE) by weight, and about 42% Ultra High Density Polyethylene (HDPE) by weight. Another dry mixture has about 51% Magnesium by weight, about 3% Iron by weight, about 7% Sodium Chloride by weight, about 2% Low density Polyethylene (LPE) by weight, and about 37% Ultra High Density Polyethylene (HDPE) by weight.

Typically utensils such as plastic forks, knives, and spoons together with seasoning packets are supplied with the meal. Seasoning packets may include condiments such as salt and pepper, catsup, mustard, and hot sauce packets. A napkin and wet wipe or moist towelette can also be packaged into the carton. These items are commercially available in prepackaged cellophane packets. The third compartment provides a useful space to store these items.

The first compartment can contain and be used to heat foods covered in a variety of packaging materials, referred to above as the heating container. For example, a breakfast meal can contain pancakes packaged in a heavy cellophane cover which serves as the heating container. Sausage links can be packed in a foil pouch and packages of pancake syrup can be covered in polyethylene packets. The foil pouch and polyethylene packets serve as the heating containers. The first compartment can contain and be used to heat foods, liquids and beverages, such as tea, coffee, hot chocolate and soup. Additionally, the first compartment can be used to heat more than one item at a time.

The beverage container 16 may hold or contain beverages, such as water, juices, electrolyte replacement drinks, carbonated beverages, and may be in the form of bottles, cans, boxes, pouches. The second compartment also can contain a cup or glass from which to drink beverages heated in compartment one.

While the preferred embodiment of the present invention has been described fully in order to explain its principles, it is understood that various modifications or alterations may be made to the preferred embodiment without departing from the scope of the invention as set forth in the appended claims.

Accordingly, what is desired to be secured by Letters Patent of the United States is the invention as defined and differentiated in the following claims:

The invention claimed is:

1. A self-heating meal assembly, said assembly comprising:
   a carton comprising;
   a closable insulating first compartment containing a self-heating meal,
   said first compartment having a first top wall and a first flap covering a first opening to said first compartment and a first securing means for releasably securing said first flap in a first closed position,
   a second compartment containing a beverage container,
   a hole in a second top wall of said second compartment suitable for holding said beverage container.

2. An assembly as claimed in claim 1 wherein said first flap is a first side of said carton and attached to a bottom of said carton and said first securing means is a bendable first end tab along a first free end of said first flap.

3. An assembly as claimed in claim 2 wherein said second compartment further includes a second flap covering a second opening to said second compartment and a second securing means for releasably securing said second flap in a second closed position.

4. An assembly as claimed in claim 3 wherein said second flap is a second side of said carton and is attached to said second top wall and said second securing means is a bendable second end tab along a second free end of said second flap.

5. An assembly as claimed in claim 4 further comprising scored lines in said first top wall, said scored lines outlining an aperture area and being capable of forming an aperture for holding a heating container by cutting along said scored lines.

6. An assembly as claimed in claim 5 wherein scored lines define bendable aperture flaps suitable to be bent inward.

7. An assembly as claimed in claim 2 further comprising a third compartment in said carton disposed between said first and second compartments.

8. An assembly as claimed in claim 7 wherein said third compartment is open along a top side of said carton.

9. An assembly as claimed in claim 8 wherein said third compartment contains packaged foods.

10. An assembly as claimed in claim 9 further comprising scored lines in said first top wall, said scored lines outlining an aperture area suitable for forming an aperture for holding said heating container by cutting along said score lines.

11. An assembly as claimed in claim 10 wherein scored lines define bendable aperture flaps suitable to be bent inward.

12. An assembly as claimed in claim 1 wherein:
said first flap includes said first top wall of said first compartment bendably connected to a first side of said carton,
an inner side wall of said first compartment is bendably connected to said first top wall, and
said securing means is an end tab along a free end of said first flap wherein said end tab is suitable for being slid and held inside a slot in a bottom side of said carton.

13. An assembly as claimed in claim 12 further comprising a third compartment in said carton disposed between said first and second compartments said third compartment containing packaged foods.

14. An assembly as claimed in claim 13 wherein said third compartment is open along a top side of said carton.

15. An assembly as claimed in claim 14 wherein said second compartment further includes a second flap covering a second opening to said second compartment and a second securing means for releasably securing said second flap in a second closed position.

16. An assembly as claimed in claim 15 wherein said second flap is a second side of said carton and is attached to said second top wall and said second securing means is a bendable second end tab along a second free end of said second flap.

17. An assembly as claimed in claim 16 further comprising scored lines in said first top wall, said scored lines outlining an aperture area and being capable of forming an aperture sized to hold said heating container by cutting along said scored lines.

18. An assembly as claimed in claim 17 wherein scored lines define bendable aperture flaps suitable to be bent inward.

19. An assembly as claimed in claim 1 further comprising:
a heating container stored within said first compartment and containing said self-heating meal,
a packet containing an exothermic dry mixture, said dry mixture operable to be activated with activating liquid to generate heat through electrochemical reactions.

20. An assembly as claimed in claim 19 wherein said packet is a wetable packet which allows activating liquid to pass through to contact said dry mixture and cause said dry mixture to be activated and generate heat through electrochemical reactions.

21. An assembly as claimed in claim 20 wherein said first flap is a first side of said carton and attached to a bottom of said carton and said first securing means is a bendable first end tab along a first free end of said first flap.

22. An assembly as claimed in claim 21 wherein said second compartment further includes a second flap covering a second opening to said second compartment and a second securing means for releasably securing said second flap in a second closed position.

23. An assembly as claimed in claim 22 wherein said second flap is a second side of said carton and is attached to said second top wall and said second securing means is a bendable second end tab along a second free end of said second flap.

24. An assembly as claimed in claim 23 further comprising scored lines in said first top wall, said scored lines outlining an aperture area sized to accommodate said heating container and being capable of forming an aperture by cutting along said scored lines.

25. An assembly as claimed in claim 24 wherein scored lines define bendable aperture flaps suitable to be bent inward.

26. An assembly as claimed in claim 23 further comprising a third compartment in said carton disposed between said first and second compartments.

27. An assembly as claimed in claim 26 wherein said third compartment is open along a top side of said carton.

28. An assembly as claimed in claim 27 wherein said third compartment contains packaged foods.

29. An assembly as claimed in claim 28 further comprising scored lines in said first top wall, said scored lines outlining an aperture area and being capable of forming an aperture by cutting along said scored line.

30. An assembly as claimed in claim 29 wherein scored lines define bendable aperture flaps suitable to be bent inward.

* * * * *